United States Patent [19]
Mattes

[11] 3,715,641
[45] Feb. 6, 1973

[54] FILM SUPPORT SYSTEM
[75] Inventor: Lyle T. Mattes, Torrance, Calif.
[73] Assignee: Cutler-Hammer, Inc., Milwaukee, Wis.
[22] Filed: Sept. 21, 1970
[21] Appl. No.: 74,059

[52] U.S. Cl. ....................................318/7
[51] Int. Cl. ...............................B65h 77/00
[58] Field of Search......................318/7, 6

[56] References Cited

UNITED STATES PATENTS

| | | | |
|---|---|---|---|
| 3,079,538 | 2/1963 | Yamashita | 318/7 |
| 3,283,228 | 11/1966 | Asseo | 318/7 |
| 3,501,682 | 3/1970 | Jacoby | 318/7 |
| 3,223,906 | 12/1965 | Dingler | 318/7 |

OTHER PUBLICATIONS

IBM Technical Bulletin Vol. 13 No. 1 June, 1970 p. 113, Reel Feed Tape Drive, F. A. Schultz et. al.

IBM Technical Bulletin Vol. 2 No. 6 April, 1960 p. 23, Control Tension Gradient Rewind System H. E. Van Winkle.

*Primary Examiner*—Bernard A. Gilheany
*Assistant Examiner*—W. E. Duncanson, Jr.
*Attorney*—Christie, Parker & Hale

[57] ABSTRACT

Film is transferred from one storage reel to another by applying torques to the reels in opposite rotational directions. The ratio of the torques applied to the reels is adjustable such that the sum of the torques remains constant. The excitation windings of the reel driving motors are connected to the outputs of a differential amplifier that maintains the sum of the excitation currents constant. The torques applied to the reels are adjusted by a control signal applied to one input of the differential amplifier so as to maintain approximately constant film transport speed. The control signal is representative of the deviation of the sum of the angular velocities of the reels from an adjustable constant value.

19 Claims, 4 Drawing Figures

INVENTOR.
LYLE T. MATTES

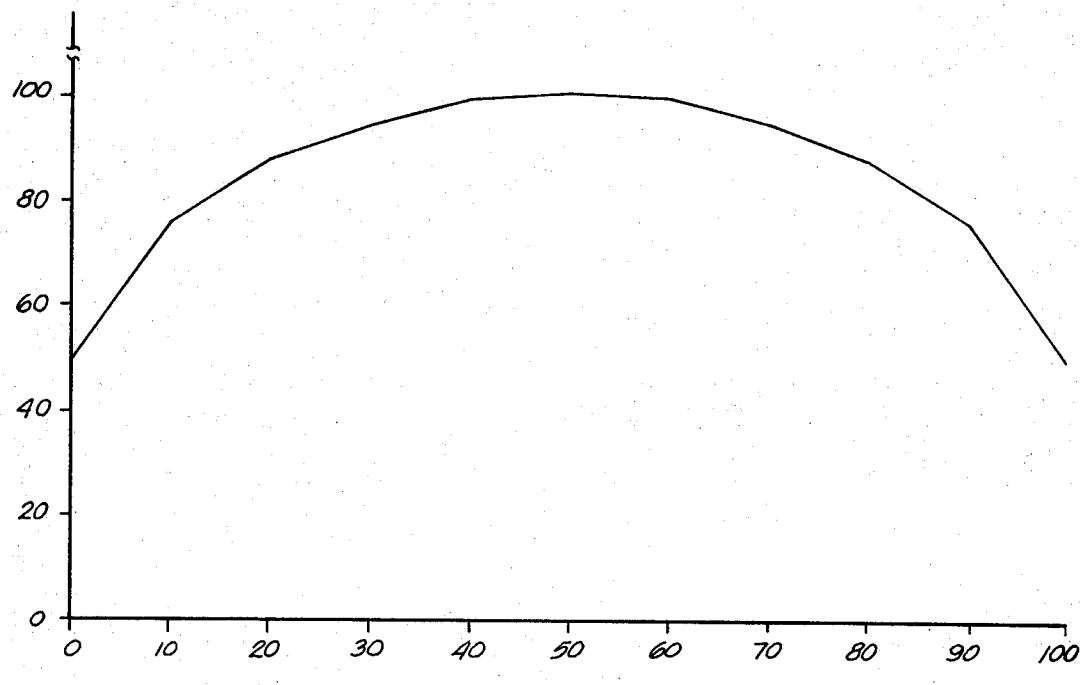
FIG_4
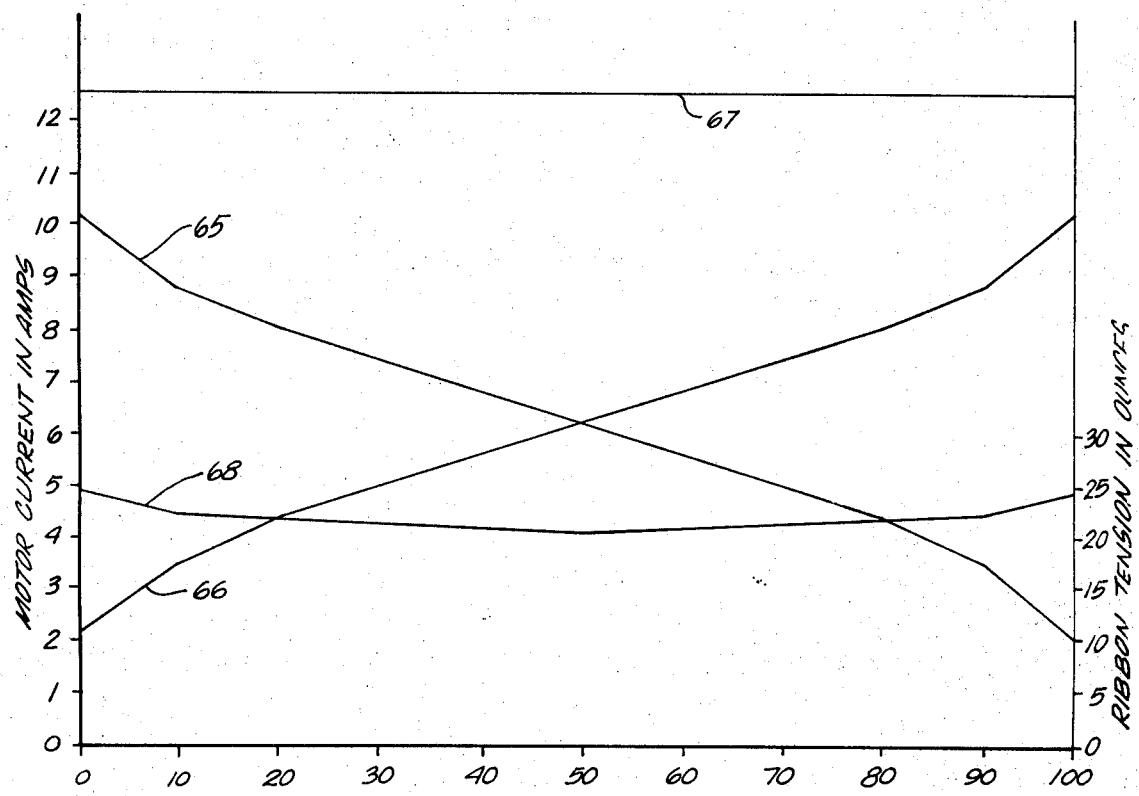
FIG_2

FILM SUPPORT SYSTEM

BACKGROUND OF THE INVENTION

This invention relates to the transport of a length of flexible ribbon such as film between storage reels and, more particularly, to a transport system that maintains substantially constant ribbon tension and/or transport speed during the transfer of the entire length of the ribbon from one reel to the other.

In a number of film transport systems, a requirement for substantially constant film tension is imposed. If the tension on the film is too great, the film may break or become damaged and if the tension on the film is too small, the film may sag or deviate from the desired film path between reels. The problem of sagging becomes more serious as the width of the film is increased because of the additional weight. At constant transport speed, the tension on the film equals the torque exerted on the takeup reel by the reel drive motor divided by the radius of the outer layer of film on the takeup reel. Thus, to maintain a constant tension on the film, the torque applied to the takeup reel must be adjusted as the footage of the film on the takeup reel changes in the course of the film transfer from one reel to the other.

Conventionally, film tension in a transport system is controlled by a servo including a spring-loaded tension arm disposed in the film path. The movement of the tension arm, which represents the tension exerted on the film, is sensed and the takeup reel drive motor is adjusted responsive to the sensed movement of the tension arm so as to maintain a substantially constant film tension. In some cases, it has been found necessary to apply a drag to the supply reel by means of a brake or a motor in order to provide the required amount of film tension. The tension arm is relatively unreliable, occupies appreciable space along the film path, and necessitates the provision of additional film guiding elements.

In a number of film transport systems, a requirement for substantially constant transport speed is imposed. For example, a photo interpretation system should have a relatively constant, slow film transport speed while the operator is visually searching the film for a particular item. Jerky or uneven film transport is bothersome to the operator who is viewing each item as it passes. In analogous fashion to film tension, the film transport speed is equal to the angular velocity of the takeup reel multiplied by the radius of the outer layer of the film on the takeup reel. Conventionally, the transport speed is controlled by a servo that adjusts the angular velocity of the takeup reel as the radius of the outer layer of film changes in the course of the film transfer between reels. The film passes over a capstan in the film path between reels and the capstan is coupled to a tachometer. The takeup reel drive motor is adjusted responsive to the output of the tachometer to maintain constant transport speed. One disadvantage with the conventional transport speed control servo is the requirement for the capstan, which is not always available or practical. For one thing, the film must be wrapped around a substantial portion of the capstan's circumference, thereby often making the film path more tortuous than it would otherwise have to be.

Moreover, the described servos for controlling film tension and transport speed are mutually exclusive of one another. If transport speed is controlled, then film tension varies uncontrolled, and vice versa.

SUMMARY OF THE INVENTION

The invention is based upon the assumption that the sum of the radii of the outer layers of film on both storage reels remains approximately constant during transfer of the entire length of film from one reel to the other. The validity of this assumption depends upon the ratio of the maximum radius of the outer layer of film on one reel to the radius of the reel hub. It has been found that the assumption is useful for small ratios.

According to one aspect of the invention, the film tension in a transport system is maintained substantially constant by applying to the storage reels oppositely directed adjustable torques whose sum remains constant. Preferably, the torques are applied to the respective reels by motors. An electric current is applied to the excitation windings of the motors by control circuitry that maintains the sum of the excitation currents constant. The control circuitry could comprise a differential amplifier, the excitation windings of the motors being connected respectively to the outputs of the differential amplifier. One input of the differential amplifier could be held at a constant reference potential and the other input could be adjusted in accordance with the desired ratio of the torques to be applied to the reels.

A feature of the above-described transport system for maintaining constant film tension is the automatic adjustment of the ratio of the torques applied to the reels to maintain a constant transport speed with the constant film tension. Specifically, a control signal is generated that represents the deviation of the actual film transport speed from a selected value. The control signal is applied to the adjusted input of the differential amplifier.

According to another aspect of the invention, a constant film transport speed is approximated by controlling the transfer of film from one reel to another so the sum of the angular velocities of the reels remains constant. A control signal is generated that is representative of the deviation of the sum of the actual angular velocities of the reels from a selected value. This control signal could be applied to the motor for the takeup reel only, with no consideration being given to the control of film tension, or it could be applied to the adjusted input of the differential amplifier discussed above. In the latter case, constant film tension is also maintained.

BRIEF DESCRIPTION OF THE DRAWINGS

The features of the specific embodiments of the best mode contemplated for carrying out the invention are illustrated in the drawings, in which:

FIG. 2 is a graph depicting the motor excitation currents for the reels of the transport system shown in FIG. 1 and the tension exerted on the film during film transfer from one reel to the other;

FIG. 4 is a graph depicting the film transport speed of the transport system shown in FIG. 3 during film transfer from one reel to the other.

DETAILED DESCRIPTION OF THE SPECIFIC EMBODIMENT

Figure 1:
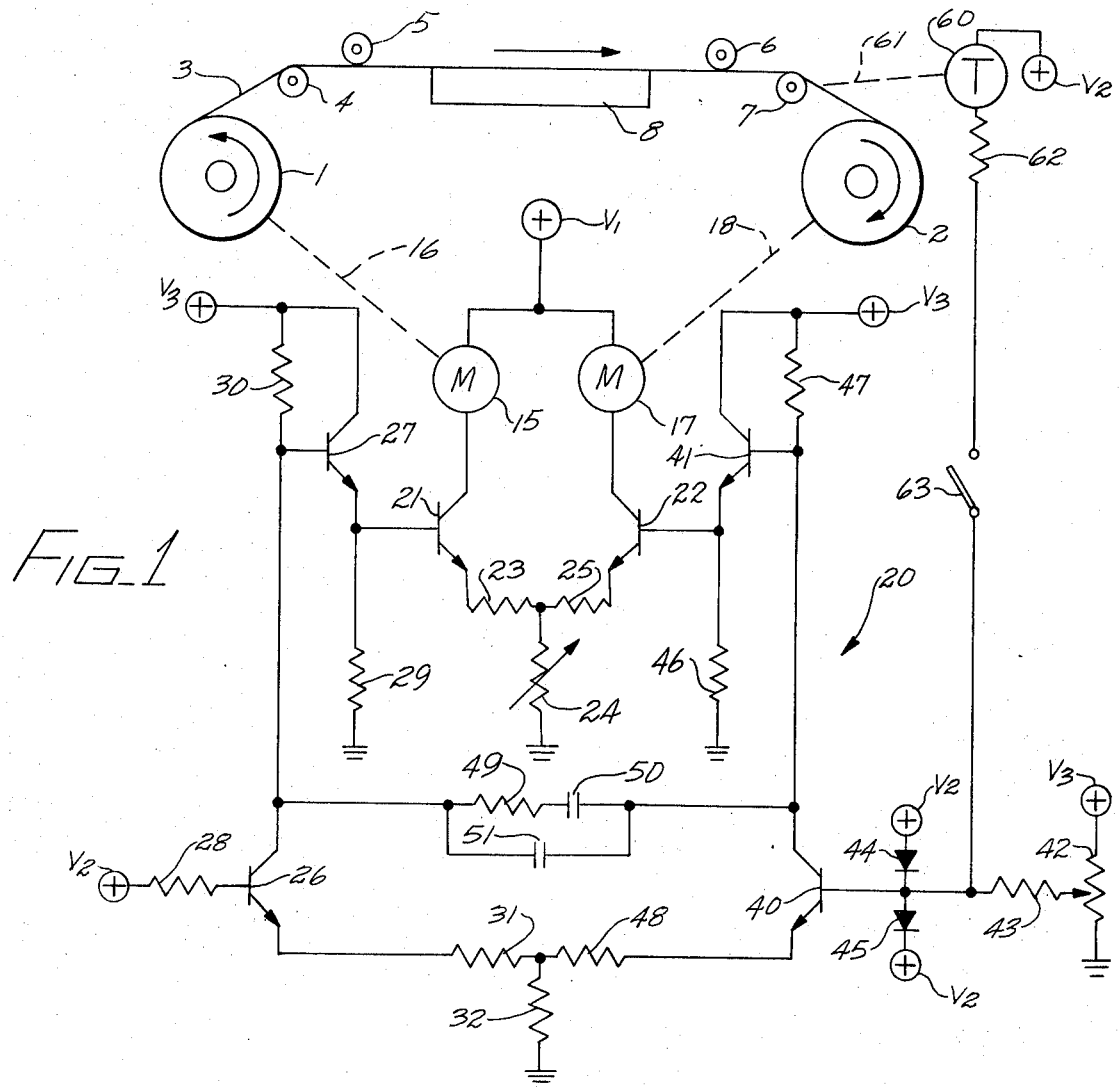
FIG. 1 is a schematic diagram of a film transport system for maintaining constant film tension and speed.

In FIG. 1, rotatably supported film storage reels 1 and 2 are shown. A length of film 3 is wound around reels 1 and 2 and is directed therebetween by guide rollers 4, 5, 6, and 7. A device 8 for utilizing the film is disposed in the film path between rollers 5 and 6. By way of example, utilization device 8 could be a light table of the type shown in the copending application of Thomas F. Adams, et al., Ser. No. 821,914, filed May 5, 1969, which is assigned to the assignee of the present application.

A drive motor 15 is mechanically coupled to reel 1 by a linkage represented with a dashed line 16, and a drive motor 17 is mechanically coupled to reel 2 by a linkage represented with a dashed line 18. Motors 15 and 17 apply torque to reels 1 and 2 in opposite rotational directions to transfer film 3 from one reel to the other. The torque applied to reel 1 by motor 15 is in the rotational direction in which film 3 winds onto reel 1, as indicated by the arrow at reel 1. Similarly, the torque applied to reel 2 by motor 17 is in the rotational direction in which film 3 winds onto reel 2, as indicated by the arrow at reel 2. When the film is wound on reels 1 and 2 as shown in FIG. 1, motor 15 applies a counterclockwise torque to reel 1 and motor 17 applies a clockwise torque to reel 2. If film 3 were wound onto reel 2 oppositely from that shown in FIG. 1, motor 17 would have to apply a counterclockwise torque to reel 2 in order to wind film 3 onto reel 2. In such case, motors 15 and 17 would both apply a counterclockwise torque to the respective reels, but the torques would be applied in opposite rotational directions in the sense that the term is used in the present specification, i.e., the torques oppose each other due to the connection between reels provided by film 3.

It has been found that the tension exerted on film 3 can be held substantially constant throughout the transfer of the entire film length by maintaining constant the sum of the torques applied to reels 1 and 2 by motors 15 and 17, respectively. The tension on film 3 at constant transport speed can be expressed by the following equation:

$$T = \tau_1/R_1 = \tau_2/R_2 \quad (1)$$

where T is the film tension, $\tau_1$ is the torque on reel 1, $\tau_2$ is the torque on reel 2, $R_1$ is the radius of the outer layer of film on reel 1, and $R_2$ is the radius of the outer layer of film on reel 2. By rearranging equation (1), the following equation is developed:

$$\tau_1/\tau_2 = R_1/R_2 \quad (2)$$

By adding one to both sides of equation (2) and algebraic manipulation, the following equation is derived.

$$\tau_2/R_2 = (\tau_1 + \tau_2)/(R_1 + R_2) \quad (3)$$

The sum of the radii of the outer layers of film on both reels, $R_1 + R_2$, remains substantially constant as long as the ratio of the maximum radius of the outer layer of film on the reel to the radius of the reel hub is not too large. For example, a ratio of 5 to 1 causes $R_1 + R_2$ to vary by only 20 percent. Therefore, if it is assumed $R_1 + R_2$ is constant, according to equations (1) and (3) the film tension can be made constant by holding constant the sum of the torques applied to the reels, $\tau_1 + \tau_2$.

To hold constant the sum of the torques applied to reels 1 and 2, the excitation windings of motors 15 and 17 are energized by a control circuit 20. The sum of the excitation currents applied to the windings of motors 15 and 17 by control circuit 20 remains constant, although the ratio of these excitation currents is adjustable. Control circuit 20 includes transistors 21 and 22, which are connected to form a differential amplifier. A source of positive bias potential $V_1$ is connected to the collector of transistor 21 by the excitation winding of motor 15 and to the collector of transistor 22 by the excitation winding of motor 17. The emitter of transistor 21 is connected by a resistor 23 to one terminal of a variable resistor 24 whose other terminal is connected to ground. The emitter of transistor 22 is connected to the ungrounded terminal of variable resistor 24 by a resistor 25. Variable resistor 24 permits the sum of the excitation currents of motors 15 and 17 to be changed to a new value. The base of transistor 21 is driven by a transistor 27, which functions as an emitter follower. The emitter of transistor 27 is connected directly to the base of transistor 21 and to ground by a resistor 29. The base of transistor 27 is connected directly to the collector of a transistor 26 and to a source of positive bias potential $V_3$ by a resistor 30. Source $V_3$ is at a lower potential than source $V_1$.

The base of transistor 22 is driven by a transistor 41, which functions as an emitter follower. The emitter of transistor 41 is connected directly to the base of transistor 22 and to ground by a resistor 46. The base of transistor 41 is connected directly to the collector of a transistor 40 and to source $V_3$ by a resistor 47.

Transistors 26 and 40 are connected to form a differential amplifier. The emitter of transistor 26 is connected to ground by resistors 31 and 32 in series. The emitter of transistor 40 is connected to the junction of resistors 31 and 32 by a resistor 48. It is advantageous to substitute a transistor that draws constant current for resistor 32. The base of transistor 26 is connected to a reference source of positive bias potential $V_2$ by a resistor 28. Reference source $V_2$ is at a lower potential than source $V_3$. An adjustable source of positive bias potential is provided by a potentiometer 42. The end terminals of potentiometer 42 are connected between source $V_3$ and ground. The movable contact of potentiometer 42 is connected to the base of transistor 40 through a resistor 43. The base of transistor 40 is protected against large deviations from the reference potential by diodes 44 and 45, which are connected between bias source $V_2$ and the base of transistor 40. Therefore, the potential at the base of transistor 40 is not permitted to deviate from the reference potential by more than the small voltage drop across diode 44 or diode 45.

When the movable contact of potentiometer 42 is adjusted to cause excitation currents in motors 15 and 17 proportional to the film radii on the associated reels 1 and 2, the resulting forces applied to the film are equal and the film is at a standstill. The relatively high ratio between the magnitude of the unbalanced torques produced by motors 15 and 17 to the unbalanced input to the differential amplifier causes this adjustment to occur when the voltage at the movable contact of potentiometer 42 is nearly equal to the reference potential of source $V_2$. When the movable contact of potentiometer 42 is adjusted so its potential is above the potential resulting in film standstill, the excitation current applied to motor 17 decreases and the excitation current applied to motor 15 increases. As a result, the film is transported from reel 2 to reel 1, motor 15 is driving, and motor 17 is dragging. Similarly, when the movable contact of potentiometer 42 is adjusted so its potential is below that resulting in film standstill, the excitation current applied to motor 17 increases and the excitation current applied to motor 15 decreases. As a result, the film is transported from reel 1 to reel 2, motor 17 is driving, and motor 15 is dragging.

The transport system of FIG. 1 can be employed to control automatically the transport speed of film 3. A tachometer 60 is mechanically coupled to guide roller 7 by a linkage represented with a dashed line 61. Tachometer 60 generates a voltage proportional to the angular velocity of roller 7, which is in turn proportional to the transport speed of film 3. Tachometer 60, a resistor 62, and a switch 63 are connected in series between source $V_2$ and the base of transistor 40. When switch 63 is closed, a constant transport speed servo is formed. The desired transport speed is selected by adjusting potentiometer 42. The servo drives control circuit 20 so as to hold the potential at the base of transistor 40 nearly equal to the reference potential of source $V_2$. As a result, the actual transport speed is maintained at the selected value, which can be varied at will in either direction from zero.

A compensation network comprising the series combination of a resistor 49 and a capacitor 50 in parallel with a capacitor 51 couples the collectors of transistors 26 and 40 to prevent oscillations in the servo system.

In FIG. 2, curves 65, 66, 67, and 68 represent the operation of the transport system of FIG. 1 graphically. Curve 65 represents the excitation current in amperes of motor 15 (also motor torque) as a function of the percentage of the total length of film stored on reel 2. Curve 66 represents the excitation current of motor 17 in amperes (also motor torque) as a function of the percentage of film stored on reel 2. Curve 67, which is the sum of curves 65 and 66, is constant along the entire abscissa of the graph. Curve 68 represents the tension in ounces exerted on film 3 as a function of the percentage of film on reel 2, assuming a reel with a one inch hub radius and a maximum outer film layer radius of five inches. As depicted in the graph, the film tension remains substantially constant during the transfer of the entire length of the film from one reel to the other, varying by only about 20 percent. If a constant torque were applied to one reel, the film tension would vary over a 5 to 1 range during the transfer of the entire length of film.

Figure 3:
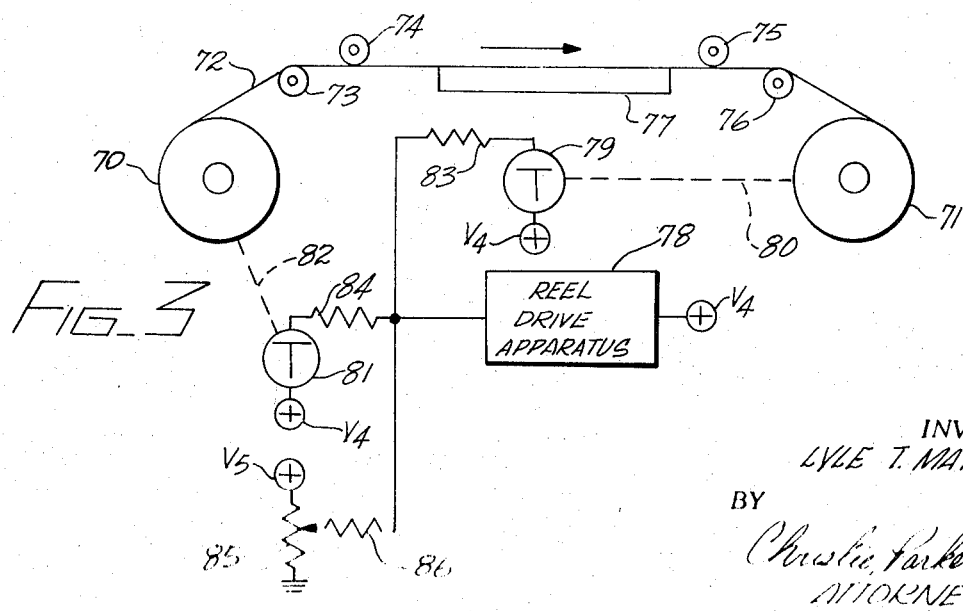
FIG. 3 is a schematic diagram of a film transport system for approximating a constant film transport speed.

In FIG. 3, storage reels 70 and 71 are rotatably supported. A length of film 72 is wound on reels 70 and 71 and is directed therebetween by guide rollers 73, 74, 75, and 76. A utilization device 77 is disposed between rollers 74 and 75. Reel drive apparatus 78 is represented as a block in FIG. 3. Apparatus 78 could be the same as the reel drive apparatus of FIG. 1, or it could be conventional reel drive apparatus, e.g., a single motor driving only one reel. In the former case, the input to apparatus 78 would be the base of transistor 40 and the film tension would be held substantially constant. In the latter case, the film tension would not be held substantially constant. In any case, a source of positive potential $V_4$ provides a reference to apparatus 78 for film speed control.

A tachometer 79 is mechanically coupled to reel 71 by a linkage represented with a dashed line 80. A tachometer 81 is mechanically coupled to reel 70 by a linkage represented with a dashed line 82. Tachometer 79 and a resistor 83 are connected in series between a source of positive bias potential $V_4$ and the input of apparatus 78. Positive bias potential $V_4$ is the same as the reference potential applied to the other input of apparatus 78. Tachometer 81 and a resistor 84 are also connected between source $V_4$ and the input of apparatus 78. The end terminals of a potentiometer 85 are connected between ground and a source of positive bias potential $V_5$, which is larger than the potential of $V_4$. The movable contact of potentiometer 85 is connected by a resistor 86 to the input of apparatus 78.

The system of FIG. 3 approximates a constant film transport speed on the basis of the angular velocities of reels 70 and 71. Specifically, the system drives reels 70 and 71 so the sum of their angular velocities remains constant. It has been discovered that when this condition is met, the film transport speed remains approximately constant.

In FIG. 4, the graph represents the percentage of the maximum transport speed as a function of the percentage of the total length of film that is stored on reel 2, assuming a reel with a 1 inch hub radius and a maximum outer film layer radius of 5 inches. The recognition that the film transport speed remains approximately constant when the sum of the angular velocities of the reels is held constant is also based upon the fact that the sum of the radii of the outer layers of film on both reels remains substantially constant when the ratio of the maximum radius of the outer layer of film on a reel to the radius of the reel hub is not too large. However, a comparison of FIGS. 2 and 4 shows that the transport speed in the system of FIG. 2 is not held as constant as the film tension in the system of FIG. 1.

The transport speed of film 72 is adjusted by positioning the movable contact of potentiometer 85. When the movable contact of potentiometer 85 is precisely positioned so its potential equals the potential of source $V_4$, film 72 is at rest. As the movable contact of potentiometer 85 is moved away from this position, a control signal is generated at the input of apparatus 78 which drives reels 70 and 71. As a result, voltage drops are generated across tachometers 79 and 81 that offset the change in potential at the movable contact of potentiometer 85, so the input of apparatus 78 is held approximately at the potential of bias source $V_4$.

The invention can also be used to transport other types of flexible ribbon between storage reels such as magnetic tape.

What is claimed is:

1. A transport system for a length of flexible ribbon comprising:
   first and second rotatably supported storage reels;
   means for guiding ribbon between the reels;
   means for applying torques to the reels in opposite rotational directions to transfer the ribbon from one reel to the other;
   and means for adjusting the torques applied to the reels such that their sum remains constant.

2. The transport system of claim 1, in which the means for adjusting the torques comprises means for generating a control signal representative of the deviation of the actual ribbon transport speed from a selected transport speed, and means responsive to the control signal for adjusting the ratio of the torques applied to the first and second reels so as to reduce the deviation.

3. The system of claim 2, in which the guiding means includes a roller across which the ribbon passes in non-slipping contact between reels; and the means for generating a control signal comprises a tachometer coupled to the roller to produce a signal representative of the angular velocity thereof, a source of bias signals representative of a selected transport speed, and means for differentially combining the output of the tachometer and the output of the bias source.

4. The transport system of claim 3, in which the source of bias signals is adjustable.

5. The transport system of claim 2, in which the means for generating a control signal comprises a first tachometer coupled to the first reel to produce a signal representative of the angular velocity thereof, a second tachometer coupled to the second reel to produce a signal representative of the angular velocity thereof, a source of bias signals representative of a selected transport speed, and means for differentially combining the outputs of the first and second tachometers with the output of the bias source.

6. The transport system of claim 5, in which the source of bias signals is adjustable.

7. The transport system of claim 1, in which the means for adjusting the torques applied to the reels comprises means for generating a control signal representative of the deviation of the sum of the angular velocities of the reels from a selected value, and means responsive to the control signal for adjusting the ratio of the torques applied to the first and second reels so as to reduce the deviation.

8. The transport system of claim 1, in which the means for applying torques to the reels are first and second motors each having an excitation winding, the torque produced by each motor being proportional to the current passing through its excitation winding; and the means for adjusting the torques comprises a source of electrical energy, means for applying excitation current from the source to the windings of the motors such that the sum of the individual excitation currents remains constant, and means for adjusting the ratio of the individual excitation currents applied to the windings of the motors.

9. The transport system of claim 8, in which the current applying means comprises a differential amplifier, circuitry for connecting the source to the differential amplifier as bias therefor, circuitry for connecting the windings of the motors respectively to the outputs of the differential amplifier, and a constant bias source connected to one input of the differential amplifier; and the means for adjusting the ratio of the currents comprises a manually adjustable bias source connected to the other input of the differential amplifier.

10. A transport system for a length of flexible ribbon comprising:
    first and second rotatably supported storage reels;
    means for guiding ribbon between the reels;
    means for driving the first reel to transfer ribbon from the second reel to the first reel;
    and means for adjusting the reel-driving means such that the sum of the angular velocities of the reels remains constant.

11. The transport system of claim 10, in which the adjusting means comprises a first tachometer coupled to the first reel to produce a first signal representative of the angular velocity thereof, a second tachometer coupled to the second reel to produce a second signal representative of the angular velocity thereof, means for generating a control signal representative of the deviation of the sum of the first and second signals from a selected constant, and means responsive to the control signal for adjusting the reel-driving means so as to reduce the deviation.

12. The transport system of claim 11, in which the control signal generating means comprises a variable source of bias signals and means for differentially combining the first and second signals with the output of the source of bias signals.

13. The transport system of claim 12, in which the reel-driving means comprises first and second motors coupled respectively to the first and second reels, each motor having an excitation winding; means for applying current to each excitation winding such that the sum of the individual currents applied to the excitation windings is constant, and means responsive to the control signal for adjusting the ratio of the individual currents applied to the excitation windings to reduce the deviation between the sum of the angular velocities of the reels and the selected constant.

14. A transport system comprising:
    a first rotatably supported storage reel having a hub;
    a second rotatably supported storage reel having a hub;
    a length of flexible ribbon wound on the hubs of the first and second reels and extending therebetween, the ratio of the maximum radius of the outer layer of the ribbon on each reel to the radius of the hub of such reel being sufficiently small that the sum of the radii of the outer layers of the ribbon on both reels remains substantially constant;
    means for applying to the first reel a variable driving torque in a direction to unwind the ribbon from the second reel and wind it onto the first reel; and
    means for applying to the second reel a variable drag that opposes the unwinding of the ribbon from the second reel, the sum of the variable drag on the second reel and the variable driving torque on the first reel being constant.

15. The transport system of claim 14, in which the driving torque applied to the first reel is controlled to maintain a constant transport speed.

16. The transport system of claim 14, in which the driving torque applied to the first reel is controlled to maintain the sum of the angular velocities of the reels substantially constant.

17. The transport system of claim 14, in which the means for applying a variable driving torque to the first reel comprises a first motor having an excitation winding and means for applying an excitation current to the winding of the first motor; the means for applying a variable drag to the second reel comprises a second motor having an excitation winding and means for applying an excitation current to the winding of the second motor, the sum of the individual excitation currents of the first and second motors being constant; and means for adjusting the ratio of the individual excitation currents of the first and second motors.

18. The transport system of claim 1, in which the first and second storage reels each have a hub, the system additionally comprising an elongated flexible ribbon wound on the hubs of the first and second reels and guided therebetween by the guiding means, the length of the ribbon relative to the radius of the hub of each reel being sufficiently small that the sum of the radii of the outer layers of the ribbon on both reels remains substantially constant during transport of the entire length of the ribbon from one reel to the other.

19. The transport system of claim 10, in which the first and second reels each have a hub, the transport system additionally comprising an elongated flexible ribbon wound on the hubs of the first and second reels and guided therebetween by the guiding means, the ratio of the maximum radius of the outer layer of the ribbon on each reel to the radius of the hub of such reel being sufficiently small that the sum of the radii of the outer layers of ribbon on both reels remains substantially constant during transport of the entire length of the ribbon from one reel to the other.

* * * * *